(12) United States Patent
Haverkamp et al.

(10) Patent No.: US 9,791,694 B1
(45) Date of Patent: Oct. 17, 2017

(54) TRANSPARENT FILM DISPLAY SYSTEM FOR VEHICLES

(71) Applicant: Rockwell Collins, Inc., Cedar Rapids, IA (US)

(72) Inventors: David A. Haverkamp, Springville, IA (US); Patrick G. Pendleton, Center Point, IA (US); Chad M. Fickbohm, Colorado Springs, CO (US); Thomas W. Pepper, Jr., Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 98 days.

(21) Appl. No.: 14/821,315

(22) Filed: Aug. 7, 2015

(51) Int. Cl.
  *G02B 27/01* (2006.01)
  *G06F 3/041* (2006.01)
  *G06F 3/01* (2006.01)
  *B60R 1/00* (2006.01)

(52) U.S. Cl.
  CPC ............. *G02B 27/01* (2013.01); *B60R 1/001* (2013.01); *G06F 3/013* (2013.01); *G06F 3/041* (2013.01); *B60R 2300/205* (2013.01); *B60R 2300/308* (2013.01); *B60R 2300/802* (2013.01); *B60R 2300/8073* (2013.01)

(58) Field of Classification Search
  CPC .................................................. G06F 1/1652
  See application file for complete search history.

(56) References Cited

U.S. PATENT DOCUMENTS

| 2001/0029425 | A1* | 10/2001 | Myr ................... | G01C 21/3492 |
| | | | | 701/117 |
| 2006/0164261 | A1* | 7/2006 | Stiffler .................. | G01C 23/00 |
| | | | | 340/945 |
| 2012/0139733 | A1* | 6/2012 | Lee ........................ | A61B 5/18 |
| | | | | 340/575 |
| 2014/0375529 | A1* | 12/2014 | Yun ....................... | G06F 3/1446 |
| | | | | 345/1.3 |
| 2015/0243849 | A1* | 8/2015 | Stroetmann ......... | H01L 29/1606 |
| | | | | 257/13 |
| 2016/0202816 | A1* | 7/2016 | Park ...................... | G06F 1/1652 |
| | | | | 345/173 |
| 2016/0327786 | A1* | 11/2016 | Ichinokawa ....... | G02B 27/0149 |

* cited by examiner

*Primary Examiner* — Larry Sternbane
(74) *Attorney, Agent, or Firm* — Angel N. Gerzhikov; Donna P. Suchy; Daniel M. Barbieri

(57) ABSTRACT

A transparent flexible display film is applied to a vehicle windshield, either as a film applied to the surface of the windshield or as a layer in the laminated glass comprising the windshield. A connected computer renders a synthesized view of the external environment around the vehicle, including visual representations of information received from an on-board data sensor or from an external source. No special glasses or helmets are required for the operators and if the system fails, the display film is transparent and will not impede the operators view.

17 Claims, 7 Drawing Sheets

TRANSPARENT FILM DISPLAY SYSTEM FOR VEHICLES

BACKGROUND

Current heads-up display (HUD) systems require complex display projection/combiner hardware. A typical HUD contains a projector unit, a combiner, and a display computer. The projection unit in a typical HUD is an optical collimator with a convex lens or concave mirror and a display element producing an image where the light is collimated. The combiner is typically an angled flat piece of glass (a beam splitter), located directly in front of the viewer, that redirects the projected image from projector in such a way as to see the field of view and the projected image at the same time. The combiner may have a special coating that reflects the monochromatic light projected onto it from the projector unit while allowing all other wavelengths of light to pass through. In some optical layouts, combiners may also have a curved surface to refocus the image from the projector.

Existing HUD systems are not suitable for installation into many airplanes because of weight and complexity. Consequently, it would be advantageous if an apparatus existed that is suitable for providing HUD functionality in vehicles.

SUMMARY

Accordingly, embodiments of the inventive concepts disclosed herein are directed to a transparent film display system that may be implemented to provide HUD functionality in some embodiments.

In one aspect, the inventive concepts disclosed herein are directed to a transparent flexible display film applied to a surface. The transparent flexible display film is applied to a vehicle window much like tinting membranes. Informational indicators are rendered on the transparent flexible display film. In some embodiments, the transparent flexible display film may be made an integral part of the glass similar to laminated safety glass. A computer control port connects a computer to the transparent flexible display film.

In some applications, the computer may present to the occupants a synthesized view of the external environment around the vehicle to protect the occupants from external sources of danger such as IED's, and small arms fire.

It is to be understood that both the foregoing general description and the following detailed description are exemplary and explanatory only and should not restrict the scope of the claims. The accompanying drawings, which are incorporated in and constitute a part of the specification, illustrate an embodiment of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
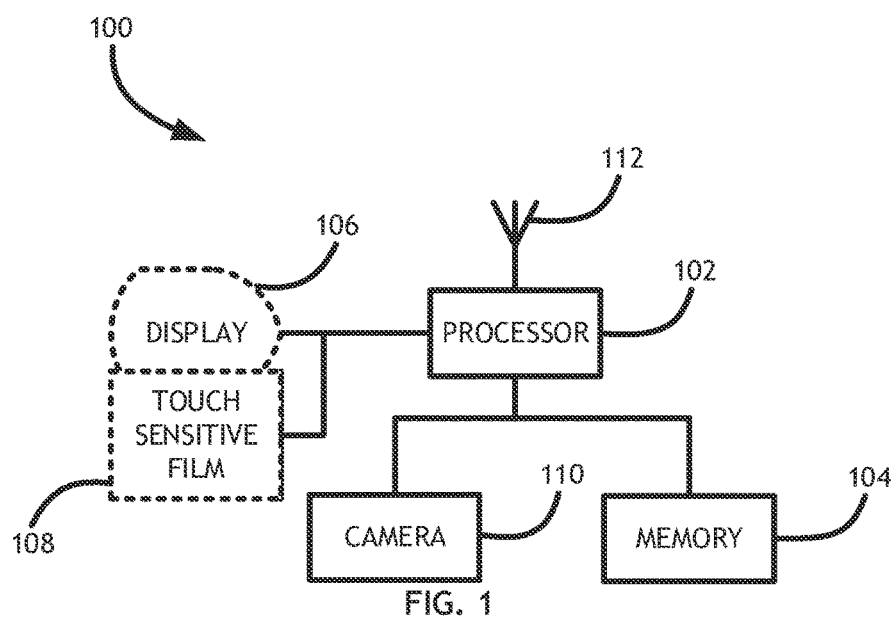
FIG. 1 shows an embodiment of a transparent display system according to the inventive concepts disclosed herein.

Referring to FIG. 1, an embodiment of a transparent display system 100 according to the inventive concepts disclosed herein is shown. The computer system 100 includes a processor 102 and memory 104 connected to the processor 102 for storing computer executable code. The transparent display system 100 also includes a transparent flexible display film 106 connected to the processor 102. In some embodiments, a touch-sensitive film 108 connected to the processor 102 may overlay the transparent flexible display film 106. In some embodiments, a camera 110 may be connected to the processor 102 for head or eye tracking. Further, in some cases a head tracking system other than the camera 110 may be implemented, such as an inertial measuring unit, an optical tracker, a magnetic tracker, or combinations thereof.

The transparent flexible display film 106 may comprise transparent conductors based on silver nanowires and organic light emitting diodes (OLED), active matrix organic light emitting diodes (AMOLED) or other appropriate technology for creating a transparent flexible display film 106. Silver nanowires have significantly higher optical and electrical conductivity than other currently used materials such as indium tin oxide (ITO) and other transparent conductors. In one embodiment, the transparent flexible display film 106 may be applied to a glass windshield; alternatively, the transparent flexible display film 106 may be incorporated into the Laminated glass windshield of an aircraft or other vehicle to create safety glass with embedded display capability. The direct use of the windshield as compared to a combiner allows the processor 102 to display HUD or other appropriate information directly in the operator's view. A person skilled in the art may appreciate that "transparent," as used in the present disclosure refers to light transmission sufficient to allow a user to resolve external details through a window including transparent flexible display film 106.

In some embodiments, the transparent flexible display film 106 may be applied to non-transparent surfaces in a vehicle.

The transparent flexible display film 106 may be produced via 3D printing or specialized ink-jet printing to print circuitry onto a transparent film for quickly creating circuitry. Further, some materials, for example polyimide, PEEK, or transparent conductive polyester, allow circuit boards and OLED/AMOLED displays to be applied to curved surfaces.

The transparent display system 100 may also include an antenna 112 connected to the processor 102. The processor 102 receives data corresponding to an external event, such as a weather related phenomena, and renders an image of the external event on the transparent flexible display film 106. The processor 102 may select a rendering location based on a known location and orientation of the transparent flexible display film 106 and a location of the external event based on the received data.

Figure 2:
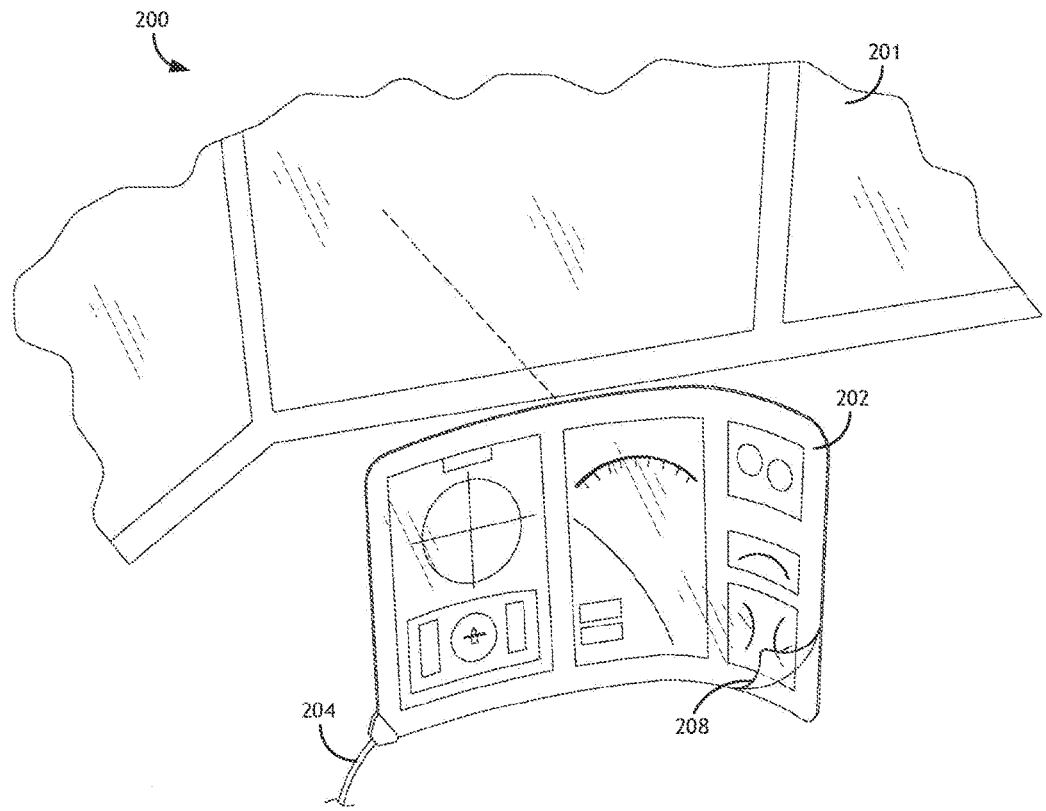
FIG. 2 shows an environmental view of a transparent display system according to one embodiment of the inventive concepts disclosed herein.

Referring to FIG. 2, an environmental view of an embodiment of a transparent display system 200 according to the inventive concepts disclosed herein is shown is shown. A transparent flexible display film 202 is connected to a computer via a data cable 204, or some other wireless connection, and applied to a transparent surface such as a cockpit window 201.

In some embodiments, the transparent flexible display film 202 may comprise a touch sensitive film 208, also connected to the computer via the data cable 204.

While certain specific embodiments described herein refer to a transparent flexible display film 202 applied or incorporated into a windshield, some embodiments may be incorporated into other windows and surfaces in a vehicle. Furthermore, transparent flexible display films 202 covering various windows and surfaces in a vehicle may be configured to allow continuous images across more than one transparent flexible display film 202.

Figure 3:
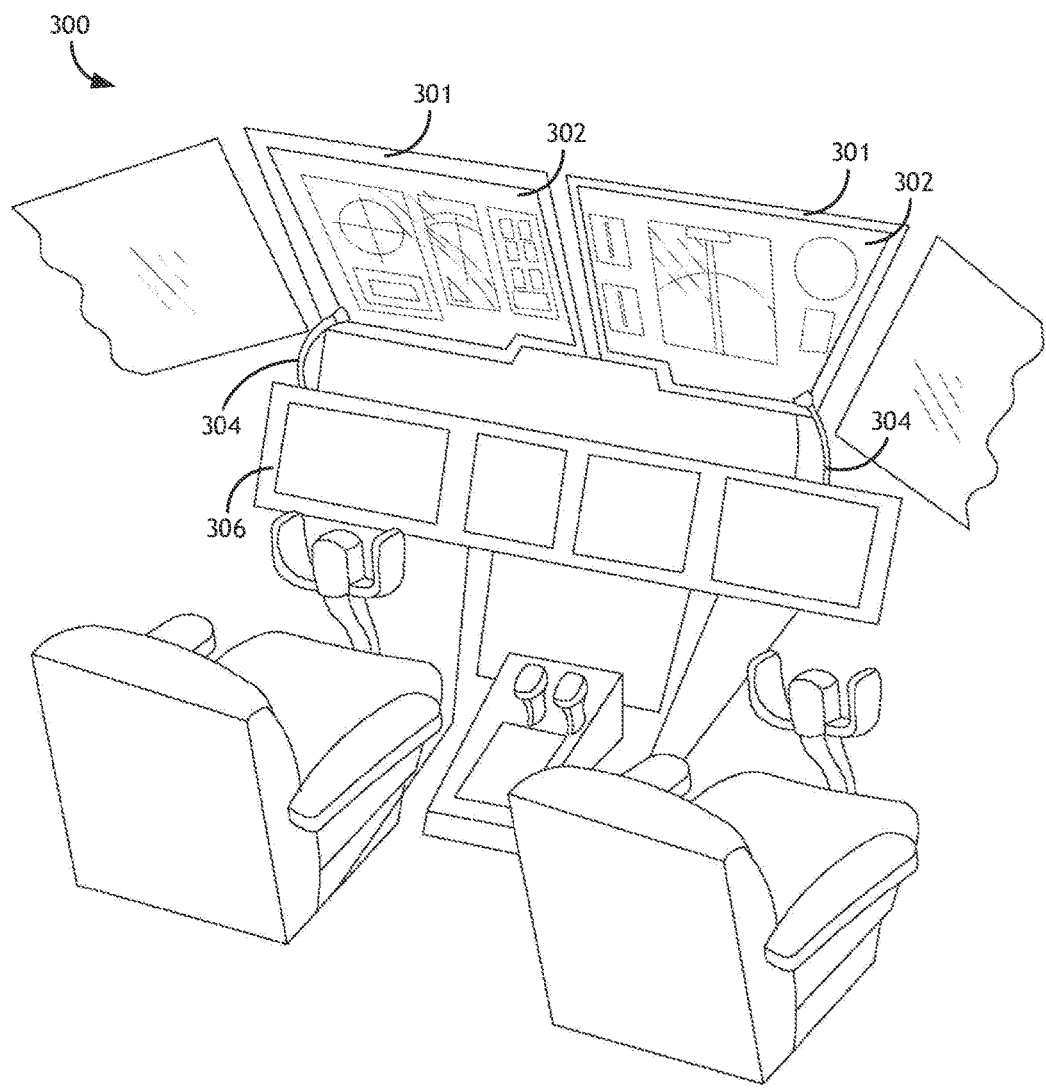
FIG. 3 shows an environmental view of one embodiment of a transparent display system according to the inventive concepts disclosed herein.

Referring to FIG. 3, an environmental view of one embodiment of a transparent display system 300 according to the inventive concepts disclosed herein is shown incorporated into an aircraft cockpit. One or more exterior windows 301 of the aircraft include a transparent flexible display film 302 applied to the interior surface of the exterior window 301, or incorporated as a layer in a laminated glass exterior window 301. The transparent flexible display film 302 is connected to a computer in the aircraft via a data cable 304 or a wireless data communication mechanism. In at least one embodiment, the computer system may be incorporated into an avionics system that also provides data to standard glass cockpit display 306 systems.

Information displayed via the transparent flexible display film 302 may be HUD type cues or ghost information from an active panel in the glass cockpit display 306. In some embodiments, the transparent display system 300 may receive critical notifications from some avionics sub-system and replicate relevant avionics data on a transparent flexible display film 302 so that the operator is made aware of all relevant data to deal with the critical notification without looking away from the cockpit exterior window 301. In some embodiments, the transparent display system 300 may display a critical notification warning on the transparent flexible display film 302, within the likely line-of-sight of the operator. Operators are thereby less likely to ignore or miss critical notifications or information.

In some embodiments, the transparent display system 300 may receive data from an avionics system indicating the position and orientation of the aircraft, and produce graphical representations of important phenomena, approximately overlaid against the actual phenomena from the pilot's perspective based on the likely position of the pilots head. For example, the position or direction of otherwise invisible weather phenomena such as clear air turbulence may be indicated. Likewise, runway edges may be accentuated or "Lanes in the sky" as described in by FAA NextGen may be outlined against the actual sky.

Figure 4:
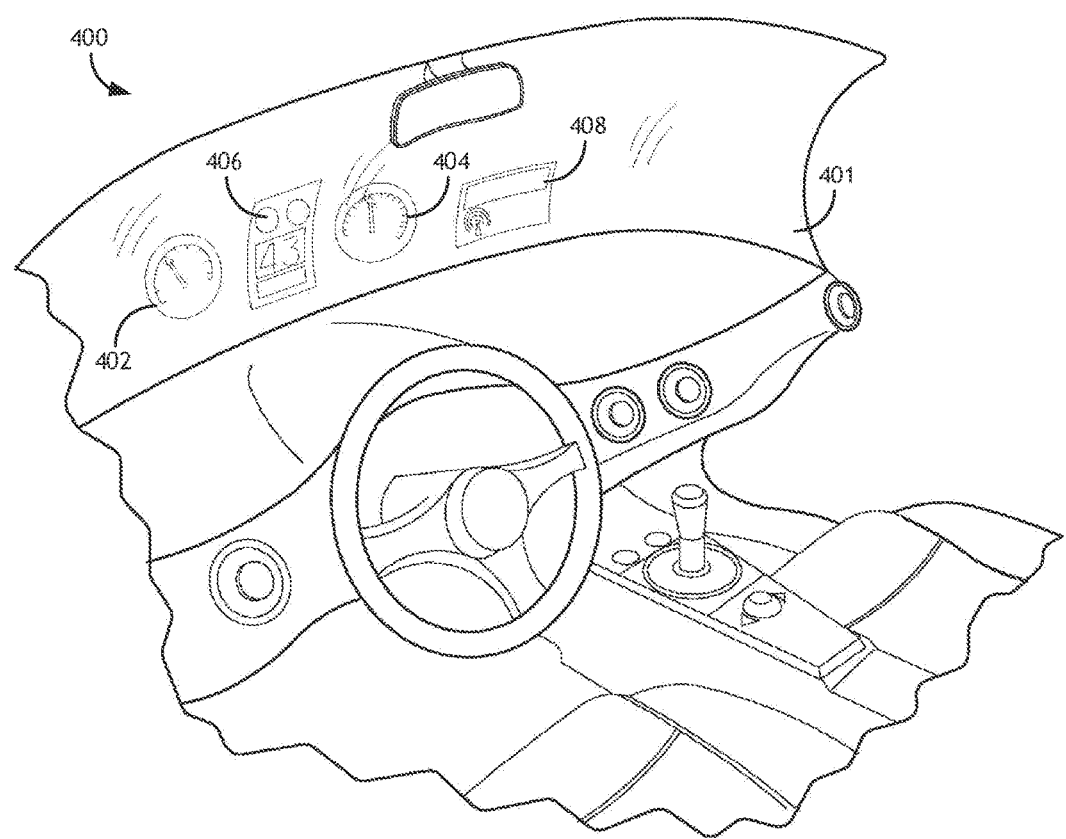
FIG. 4 shows an environmental view of one embodiment of a transparent display system according to the inventive concepts disclosed herein incorporated into an automobile.
Figure 5:
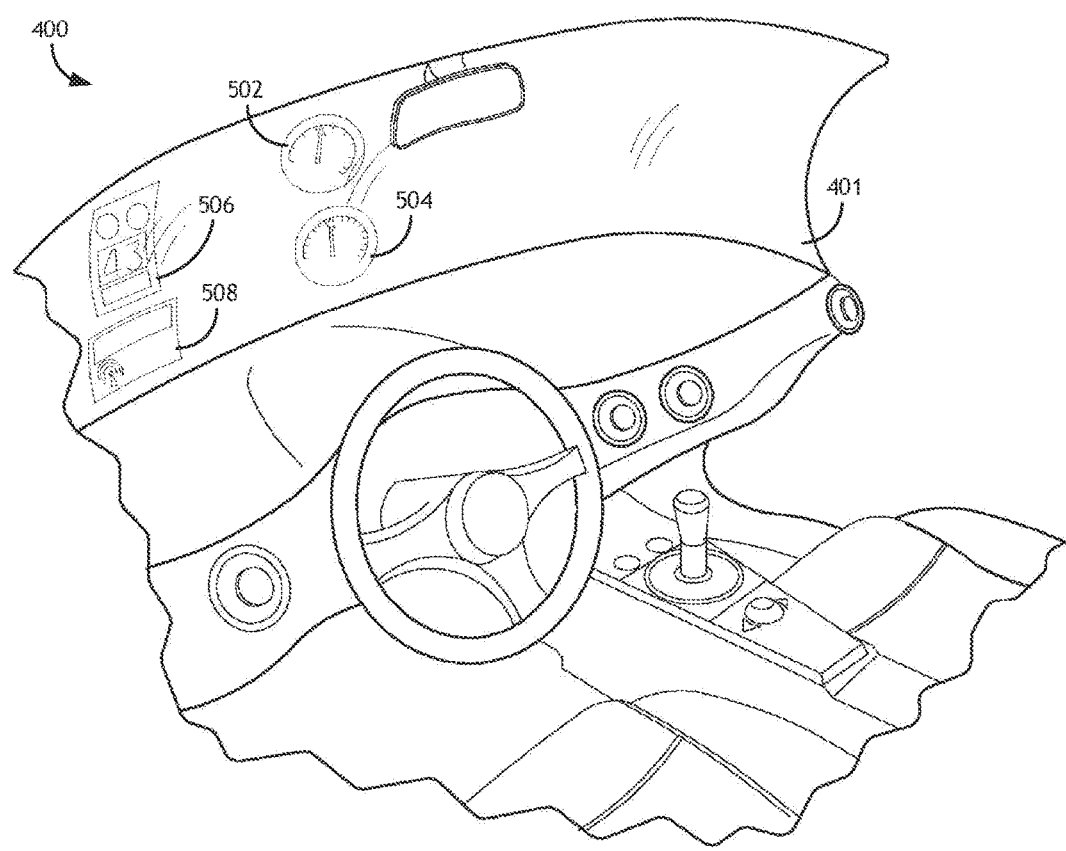
FIG. 5 shows an environmental view of one embodiment of a transparent display system according to the inventive concepts disclosed herein incorporated into an automobile.

Referring to FIGS. 4 and 5, an environmental view of an exemplary embodiment of a transparent display system 400 according to the inventive concepts disclosed herein is shown incorporated into an automobile. A transparent flexible display film is applied to an automobile windshield 401 or incorporated as a layer in the laminated glass comprising the windshield 401. Information displays 402, 404, 406, 408 traditionally relegated to an automobile dashboard may be displayed on the transparent flexible display film.

Additionally, because the information displays 402, 404, 406, 408 are instantiated in a display film, the information displays 402, 404, 406, 408 may be repositioned. For example, a first information display 402 may be moved from a first position (402) to a first information display second position 502. Likewise, a second information display 404 may be moved to a second information display second position 504, a third information display 406 may be moved to a third information display second position 506, and a fourth information display 408 may be moved to a fourth information display second position 508.

In some embodiments, the transparent display system 400 connected to the transparent flexible display film may define one or more fixed second positions 502, 504, 506, 508 designed to keep the information displays information displays 402, 404, 406, 408 within the line of sight of the driver. In another embodiment, the second positions 502, 504, 506, 508 may be adjustable by the user, for example via a touch sensitive film.

Figure 6:
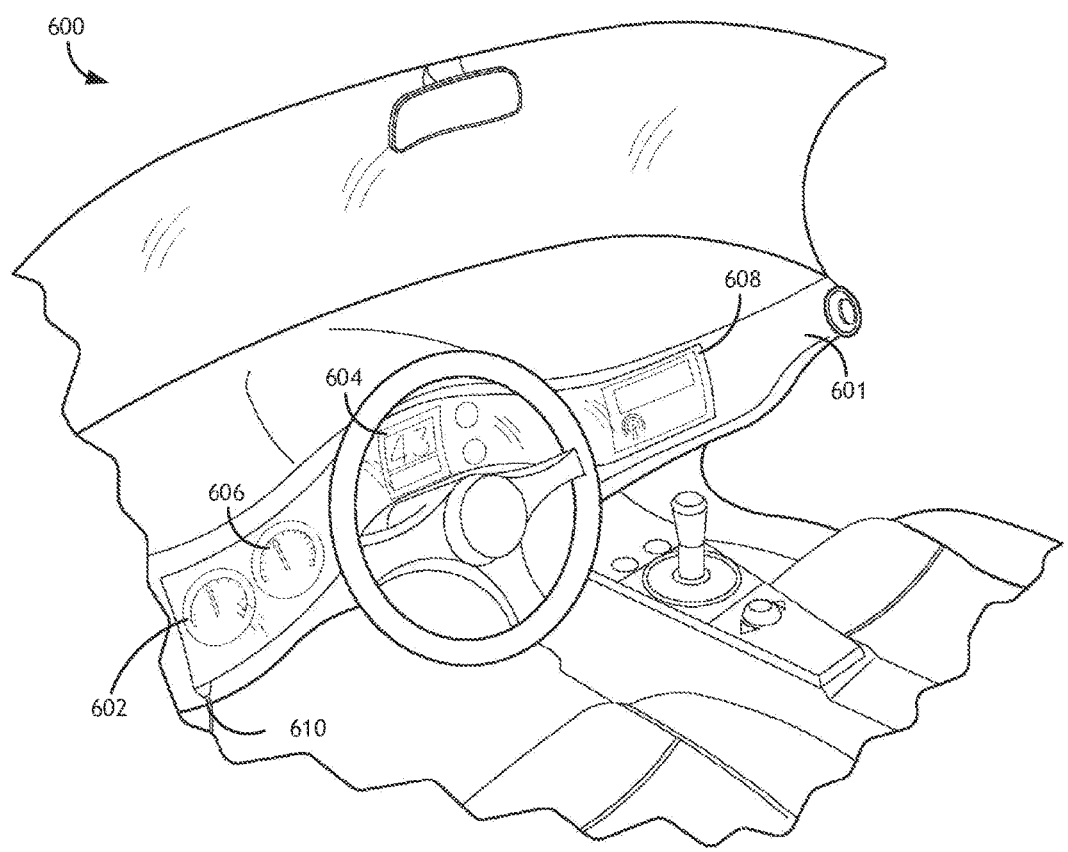
FIG. 6 shows an environmental view of one embodiment of a transparent display system according to the inventive concepts disclosed herein incorporated into an automobile.

Referring to FIG. 6, an environmental view of an exemplary embodiment of a transparent flexible display system 600 according to the inventive concepts disclosed herein is show incorporated into an automobile. A transparent flexible display film is applied to an automobile dashboard 601. Information displays 602, 604, 606, 608 traditionally relegated to an automobile dashboard 601 may be displayed on the transparent flexible display film.

Figure 7A:
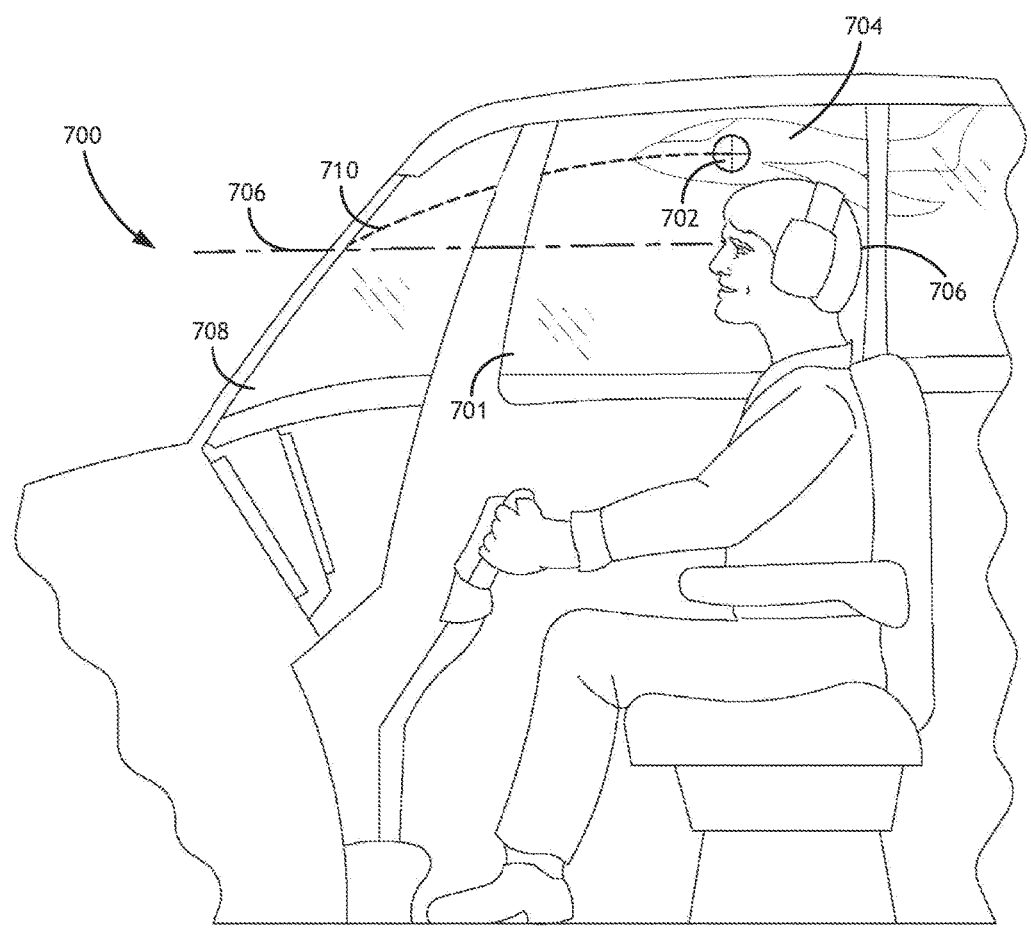
FIG. 7A shows an environmental view of one embodiment of a transparent display system according to the inventive concepts disclosed herein incorporated into an aircraft.
Figure 7B:
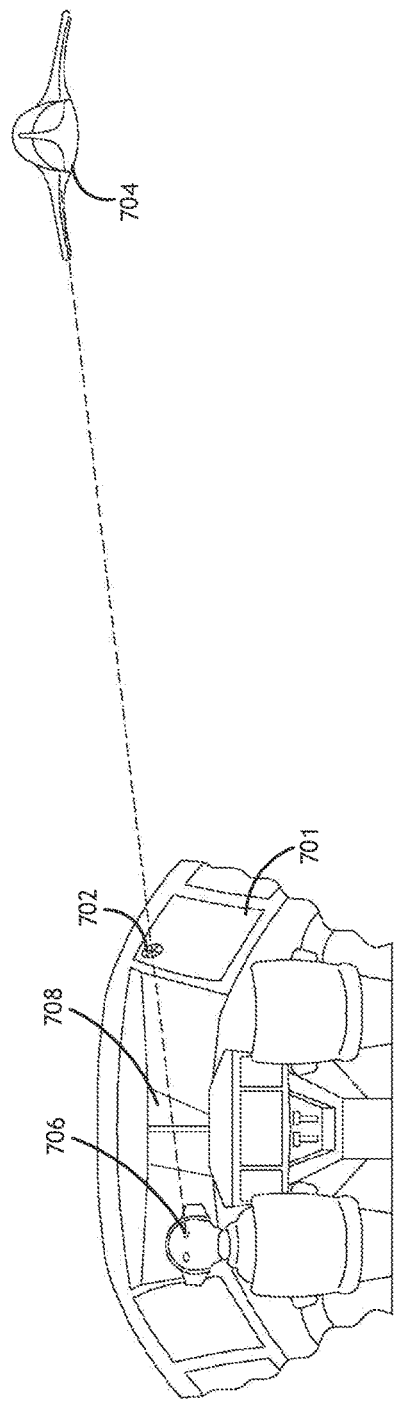
FIG. 7B shows an environmental view of one embodiment of a transparent display system according to the inventive concepts disclosed herein incorporated into an aircraft.
Figure 7C:
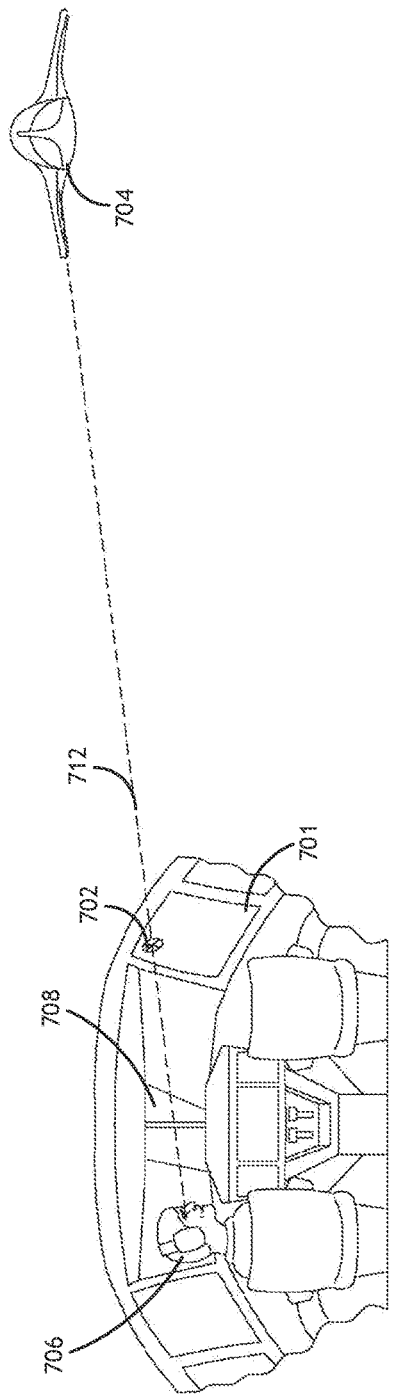
FIG. 7C shows an environmental view of one embodiment of a transparent display system according to the inventive concepts disclosed herein incorporated into an aircraft.

Referring to FIGS. 7A-7C, environmental views of an embodiment of a transparent display system 700 according to the inventive concepts disclosed herein are shown incorporated into an aircraft. An aircraft includes windshields 708 and exterior windows 701 including transparent flexible display films. A computer generating images on the transparent flexible display films, and connected to avionics systems on board the aircraft, may identify visual events, such as a proximate aircraft 704, that should be highlighted or data that may be represented visually. In one embodiment, the computer knows or is calibrated to know the location of the pilot's head 706. The computer generates visual indicia 702 at a location on the transparent flexible display film corresponding to the intersection of a line defined by the pilot's head 706 and an indicated visual event, such as the proximate aircraft 704, and the exterior window 701 or windshield 708 as appropriate. The visual indicia indicate where the pilot should look to visually identify a critical event. The location of the visual indicia 702 on the transparent flexible display film may be updated periodically based on orientation of the aircraft and the changing location of the proximate aircraft 704.

In addition, the computer may identify the pilot's actual line-of-sight 712, for example with an eye-tracking camera, and project a motion line 710 on the transparent flexible film indicating where the pilot should look to see the visual indicia 702. Further, the computer may render a visual representation of "lanes in the sky" 708 based on known, defined locations of such lanes 708 and the position and orientation of the aircraft and the known location of the pilot's head 706.

Some embodiments of the inventive concepts disclosed herein obviate the need for heavy, specialized glass and projection systems in existing HUD systems by displaying information directly on the windshield of an aircraft or other vehicle. This type of thin film display allows installation into a wider range of vehicles without the added weight and cost of a HUD projection and mounting bracket with specialized glass. Further, whereas some combiner glass coatings where operable in a wavelength range corresponding to a single color, embodiments of the present disclosure may utilize a full spectrum of colors. Some embodiments render a synthesized view of the external environment around the vehicle, including visual representations of information received from an on-board data sensor or from an external source through an antenna.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A transparent display system comprising:
   at least one processor;
   a non-transitory processor-readable memory connected to the at least one processor and configured to store processor-executable code;
   a transparent flexible display film connected to the at least one processor, the transparent display film being sufficiently transparent to resolve external details through a window including the transparent display film; and
   processor-executable code embodied in the non-transitory processor-readable memory,
   wherein:
      the processor-executable code when executed by the at least one processor, causes the at least one processor to:
         generate one or more informational display elements;
         generate a location on the transparent display film corresponding to each of the one or more informational display elements; and
         determine a known location of a head of an individual viewing the transparent display film and a line-of-sight of the individual via an eye tracking camera;
         determine a line-of-sight location on the transparent flexible display film corresponding to the line-of-sight of the individual;
         render the informational display elements on the transparent display film at the corresponding location and a motion line connecting the line-of-sight location and at least one of the one or more visual representations.

2. The transparent display system of claim 1, wherein the transparent display film is affixed to the surface of an exterior window.

3. The transparent display system of claim 1, wherein the transparent display film is incorporated as a layer in laminated glass.

4. The transparent display system of claim 1, wherein the transparent display film comprises silver nanowires.

5. The transparent display system of claim 1, further comprising a touch sensitive film connected to the at least one processor, wherein the touch sensitive film is applied to a surface in a location and orientation corresponding to the transparent display film.

6. A vehicle comprising:
   a display computer comprising:
      at least one processor;
      an antenna connected to the at least one processor; and
      a non-transitory processor-readable memory connected to the at least one processor configured to store processor-executable code;
   a windshield including a transparent flexible display film connected to the display computer, the transparent flexible display film being sufficiently transparent to resolve external details through the windshield; and
   processor-executable code embodied in the memory,
   wherein the processor-executable code when executed by the at least one processor causes the at least one processor to:
      generate one or more informational display elements corresponding to one or more dashboard indicators;
      receive data via the antenna, the data corresponding to an event external to the vehicle and comprising a location of the event;
      determine a render location on the transparent flexible display film based on a location and orientation of the vehicle and the location of the event;
      generate a location on the transparent flexible display film corresponding to each of the one or more informational display elements; and
      render the informational display elements on the transparent flexible display film at the corresponding location and a visual representation of the event at the render location.

7. The vehicle of claim 6, wherein the transparent flexible display film is affixed to the surface of the windshield.

8. The vehicle of claim 6, wherein the transparent flexible display film is incorporated as a layer in laminated glass of the windshield.

9. The vehicle of claim 6, wherein the transparent flexible display film comprises silver nanowires.

10. The vehicle of claim 6, further comprising a touch sensitive film connected to the at least one processor, wherein the touch sensitive film is applied to the windshield in a location and orientation corresponding to the transparent flexible display film.

11. The vehicle of claim 10, wherein the processor-executable code when executed by the at least one processor further causes the at least one processor to:
   receive an input from the touch sensitive film;
   generate a new location on the transparent flexible display film corresponding to one of the one or more informational display elements; and
   render the one of the one or more informational display elements at the new location.

12. An aircraft comprising:
a display computer comprising:
   at least one processor;
   an eye tracking camera connected to the at least one processor; and
   a non-transitory processor-readable memory connected to the at least one processor configured to store processor-executable code;
a windshield including a transparent flexible display film connected to the display computer, the transparent flexible display film being sufficiently transparent to resolve external details through the windshield;
one or more avionics systems connected to the display computer; and
processor-executable code embodied in the non-transitory processor-readable memory,
wherein the processor-executable code when executed by the at least one processor causes the at least one processor to:
   receive avionics specific data corresponding to an exterior event from the one or more avionics systems;
   generate one or more visual representations of the avionics specific data; and
   determine a known location of a head of a pilot of the aircraft and a line-of-sight of the pilot via the eye tracking camera;
   determine a line-of-sight location on the transparent flexible display film corresponding to the line-of-sight of the pilot;
   determine a location on the transparent flexible display film corresponding to an intersection between the transparent flexible display film and a line defined by the known location of the head of the pilot and a location of the exterior event; and
   render the one or more visual representations on the transparent flexible display film at the determined location and a motion line connecting the line-of-sight location and at least one of the one or more visual representations.

13. The aircraft of claim 12, wherein the transparent flexible display film is affixed to the surface of the windshield.

14. The aircraft of claim 12, wherein the transparent flexible display film is incorporated as a layer in laminated glass of the windshield.

15. The aircraft of claim 12, wherein the transparent flexible display film comprises si ver nanowires.

16. The aircraft of claim 12, wherein the processor-executable code when executed by the at least one processor further causes the at least one processor to:
   determine a location and orientation of the aircraft;
   render a visual representation of phenomena overlaid against actual phenomena based on a defined actual location of the actual phenomena, the location and orientation of the aircraft, and the head of the pilot.

17. The aircraft of claim 12, wherein the processor-executable code when executed by the at least one processor further causes the at least one processor to update at least one of the motion line and at least one of the one or more visual representations based on the line-of-sight of the pilot and the location and orientation of the aircraft.

* * * * *